(12) United States Patent
Oki et al.

(10) Patent No.: US 7,272,477 B2
(45) Date of Patent: Sep. 18, 2007

(54) VEHICLE PARKING ASSISTING SYSTEM AND METHOD

(75) Inventors: Tetsuya Oki, Kariya (JP); Kohji Katoh, Toyoake (JP); Hirohiko Yanagawa, Chiryu (JP)

(73) Assignee: Denso Corporation, Kariya (JP)

( * ) Notice: Subject to any disclaimer, the term of this patent is extended or adjusted under 35 U.S.C. 154(b) by 50 days.

(21) Appl. No.: 11/516,508

(22) Filed: Sep. 7, 2006

(65) Prior Publication Data

US 2007/0106440 A1   May 10, 2007

(30) Foreign Application Priority Data

Nov. 4, 2005   (JP)   ............... 2005-320998

(51) Int. Cl.
   *G06F 7/00*   (2006.01)
   *B60S 9/00*   (2006.01)

(52) U.S. Cl. .................. 701/36; 180/199; 280/761

(58) Field of Classification Search ............ 701/36, 701/41, 42, 23, 25, 28; 180/199, 167; 348/148; 280/761; 340/932.2
   See application file for complete search history.

(56) References Cited

U.S. PATENT DOCUMENTS 6,760,027 B2 *   7/2004   Endo et al. ................. 345/427
6,958,770 B2 *  10/2005   Okada et al. ............... 348/149
7,012,549 B2     3/2006   Mizusawa et al.
7,085,634 B2 *   8/2006   Endo et al. ................... 701/36
7,099,758 B2 *   8/2006   Tanaka et al. ............... 701/36

FOREIGN PATENT DOCUMENTS

| EP | 1 403 138 A1 | 3/2004 |
|---|---|---|
| JP | A-2000-142284 | 5/2000 |
| JP | A-2002-059798 | 2/2002 |
| JP | A-2002-283913 | 10/2002 |
| JP | A-2003-030627 | 1/2003 |
| JP | A-2003-143597 | 5/2003 |
| JP | A-2004-114879 | 4/2004 |
| JP | A-2004-03365 | 7/2004 |
| WO | WO 2006/100892 A1 * | 9/2006 |

* cited by examiner

Primary Examiner—Mark Hellner
(74) Attorney, Agent, or Firm—Posz Law Group, PLC (57) ABSTRACT

A vehicle parking assisting system detects an obstacle by sonar devices, and displays it as a present detection position and a past detection point on a display device in an overlapping manner with a combined birds-eye view image. The present detection point is displayed as a series of dots extending from a predetermined position in a fan-shaped detection area in an arcuate shape along a detection area of the sonar devices, and the past detection point is displayed as a single dot located at the predetermined position in the fan-shaped detection area.

10 Claims, 13 Drawing Sheets

VEHICLE PARKING ASSISTING SYSTEM AND METHOD

CROSS REFERENCE TO RELATED APPLICATION

This application is based on and incorporates herein by reference Japanese patent application No. 2005-320998 filed on Nov. 4, 2005.

FIELD OF THE INVENTION

The present invention relates to a vehicle parking assisting system and method for assisting parking of a vehicle in a rearward direction.

BACKGROUND OF THE INVENTION

Various vehicle parking assisting systems are proposed. For instance, JP 2002-59798A proposes a display of a positional relation between a vehicle and an obstacle, and JP 2000-142284A proposes a display of a distance between a vehicle and an obstacle. In addition, JP 2003-030627A and 2003-143597A propose a display of a birds-eye view image formed by combining past and present birds-eye view images.

Figure 14A:
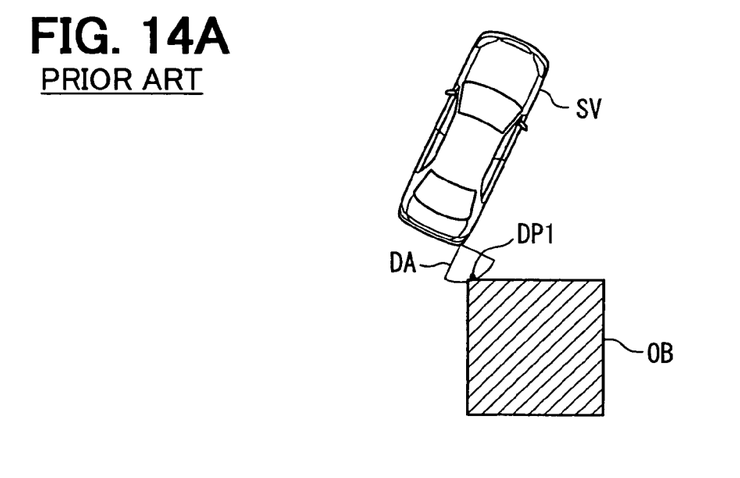
FIGS. 14A to 14C are schematic views showing relations between a vehicle and a obstacle in a conventional vehicle parking assisting system.
Figure 14B:
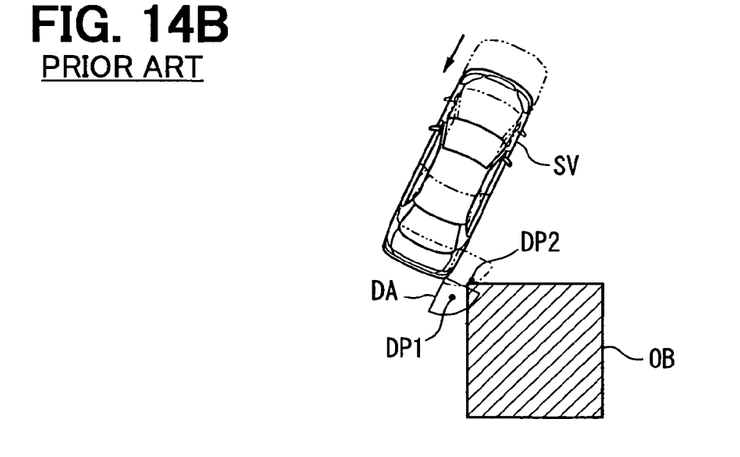
Figure 14C:
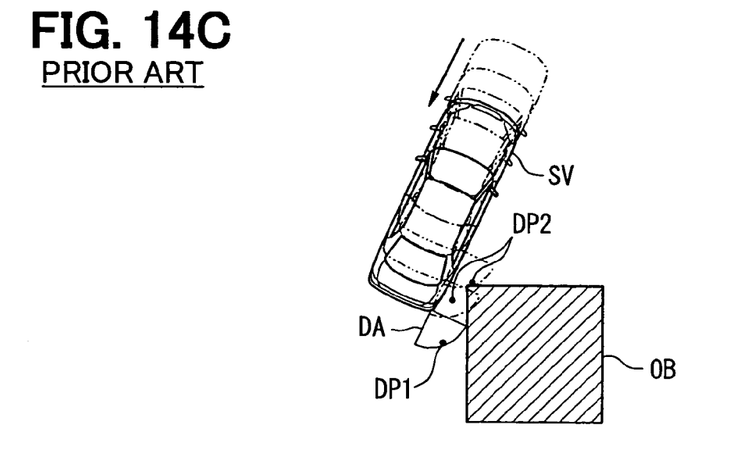
Figure 15A:
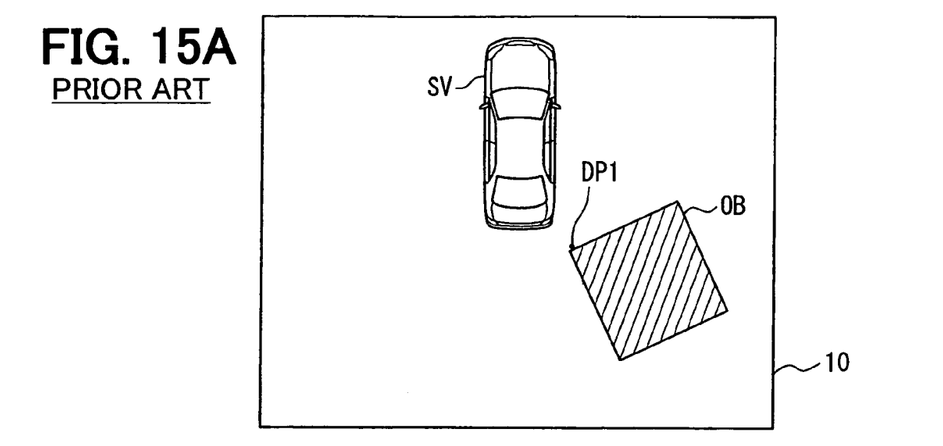
FIGS. 15A to 15C are schematic views showing display images provided in a vehicle in correspondence to the relations shown in FIGS. 14A to 14C.
Figure 15B:
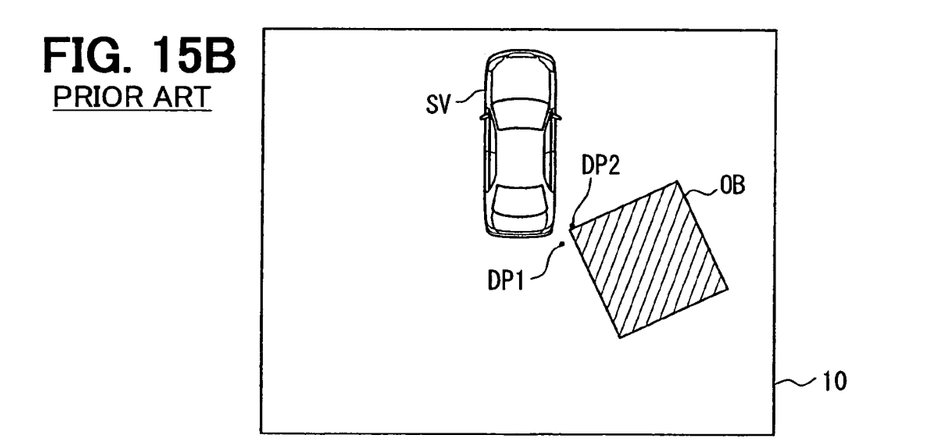
Figure 15C:
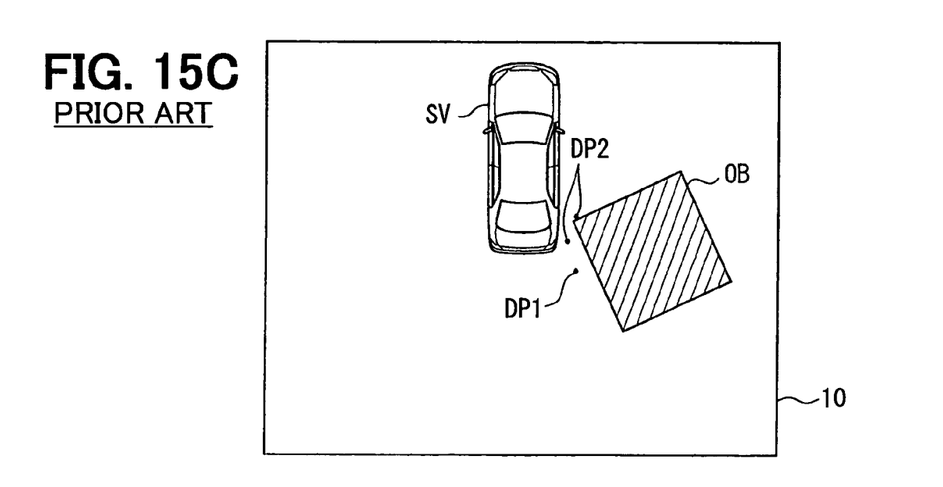

In other conventional vehicle parking assisting systems, as shown in FIGS. 14A to 14C, a subject vehicle SV has a sonar device including an ultrasonic sensor to detect an obstacle OB such as another vehicle or a building within a detection area DA of the sonar device, when moving in its rearward direction. In these figures, DP1 and DP2 denote a present detection point and a past detection point of the obstacle OB, respectively. These situations in FIGS. 14A to 14C are displayed on a display device 10 in the subject vehicle SV in such manner as in FIGS. 15A to 15C, respectively. Specifically, when the obstacle OB is detected in the detection area DA, the detection points DP1 and DP2 are provided at positions corresponding to distances to the subject vehicle SV. The positions are for instance at 45° from the longitudinal axis of the vehicle SV.

According to this display, in some instances, the detection points DP may not be provided along the outer periphery of the obstacle OB but may be provided at other positions away from the outer periphery of the obstacle OB. As a result, a driver of the vehicle SV may recognize a rearward space available for the rearward parking movement as being more limited than it actually is. Therefore this parking assisting system is not satisfactory.

SUMMARY OF THE INVENTION

The present invention is directed to vehicle parking assisting system and method, which provides a vehicle driver with a display of available space for a rearward parking movement without unduly limiting the available space.

According to an aspect of the present invention, picture images outside a vehicle are taken and converted to a birds-eye view image including a subject vehicle. This birds-eye view image is displayed in the vehicle to assist a parking operation of a driver. When an obstacle is detected in a fan-shaped detection area around the vehicle, a detection point of the obstacle, which changes as the vehicle moves, is also displayed in an overlapping manner on the birds-eye view image as a present detection point and a past detection point. The present detection point is displayed as a series of marks extending from a predetermined position in the fan-shaped detection area in an arcuate shape along the detection area. The past detection point is displayed as a mark located at the predetermined position in the fan-shaped detection area.

Preferably, a display mode of the present detection point is changed, when a distance between the vehicle and the object becomes less than a predetermined distance, to a mode that is more noticeable than when the distance is more than the predetermined distance.

Preferably, when another obstacle is detected in addition to the obstacle displayed already, another detection point corresponding to the another obstacle is displayed on the birds-eye view image in addition to the detection point already in display. In this instance, a display mode of the detection point already in display is changed so that the detection point already in display and the another detection point are displayed in different display modes from each other.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
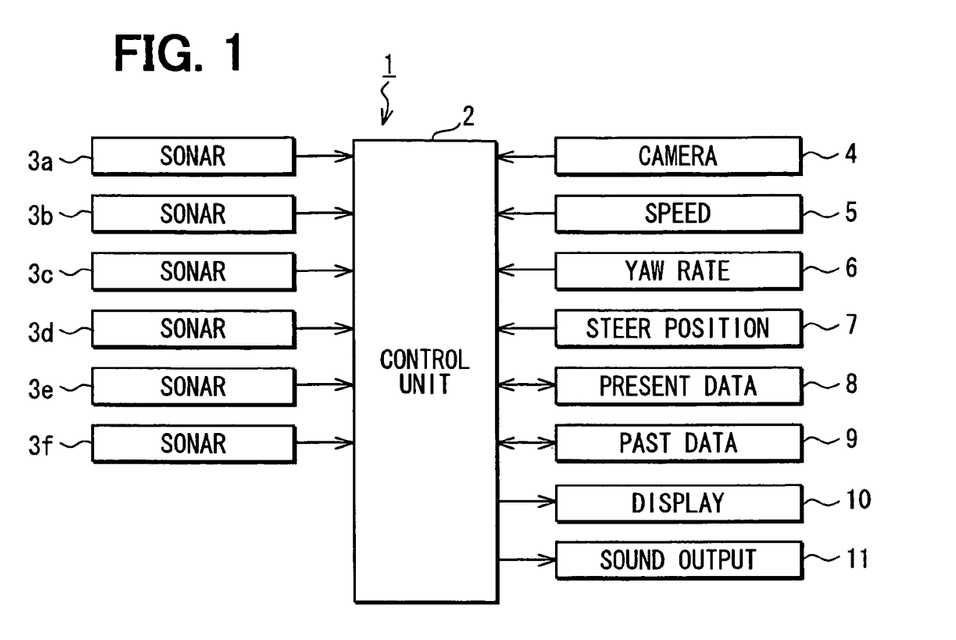
FIG. 1 is a block diagram showing a vehicle parking assisting system according to an embodiment of the present invention.

Referring first to FIG. 1, a vehicle parking assisting system 1 is constructed with an electronic control unit 2, sonar devices 3a to 3f, a camera 4, a vehicle speed sensor 4, a yaw rate sensor 6, a steering position sensor 7, a present sonar data storage device 8, a past sonar data storage device 9, a display device 10 and a sound output device 11. These various sensors and devices are connected to the control unit 2. The control unit 2 may be a microcomputer including a CPU, a RAM, a ROM, an I/O and the like, and programmed to control entire operation of the system 1.

Figure 2:
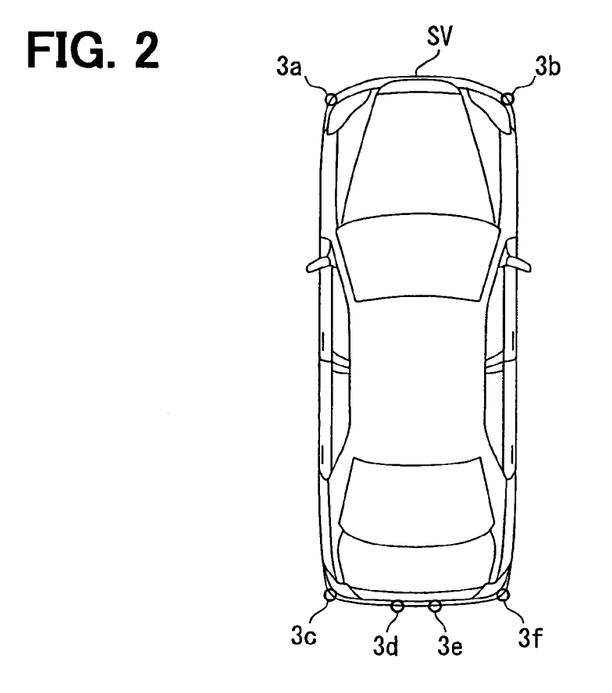
FIG. 2 is a schematic plan view showing sonar devices mounted on a vehicle.

The sonar devices 3a to 3f are mounted, as shown in FIG. 2, at the front left end, front right end, rear left end, rear central parts, and rear right end of a subject vehicle SV, respectively. Each sonar device 3a to 3f radiates ultrasonic waves over an angle of about 90° to form a generally fan-shaped detection area to detect an obstacle within this detection area.

The camera 4 is mounted at the rear part of the vehicle SV to take pictures in the rear direction of the vehicle SV and output picture images to the control unit 2. The control unit 2 generates a present birds-eye view image at this time in response to the picture images by converting the picture images by using a birds-eye view image conversion algorithm. The control unit 2 further generates a combined birds-eye view image by combining the present birds-eye view image with the past birds-eye view image or the past combined birds-eye view image.

The speed sensor 5 detects a vehicle travel speed and outputs a speed detection signal indicative of the detected speed to the control unit 2. The yaw rate sensor 5 detects a yaw rate and outputs a yaw rate detection signal indicative of the detected yaw rate to the control unit 2. The steering sensor 7 detects the turning or rotating angle of a steering wheel (not shown) and outputs a steering position detection signal indicative of the detected rotating angle to the control unit 2. Thus, the control unit 2 determines a moving or turning condition of the vehicle SV by analyzing the detection signals.

The present sonar data storage device 8 stores therein detection points DP of an obstacle OB detected at present by the sonar devices 3a to 3f as present (new) sonar data (information). The past sonar data storage device 9 stores therein detection points DP of the obstacle OB detected previously by the sonar devices 3a to 3f as past (old) sonar data. The display device 10 is mounted in the vehicle SV and provides various displays to be viewed by the driver in response to display command signals applied from the control unit 2. The sound output device 11 is mounted in the vehicle SV and provides various voice sound messages to be heard by the driver in response to sound output command signals applied from the control unit 2. It is to be noted that at least a part of functions of the above system 1, e.g., display function, may be implemented in a navigation system.

Figure 3:
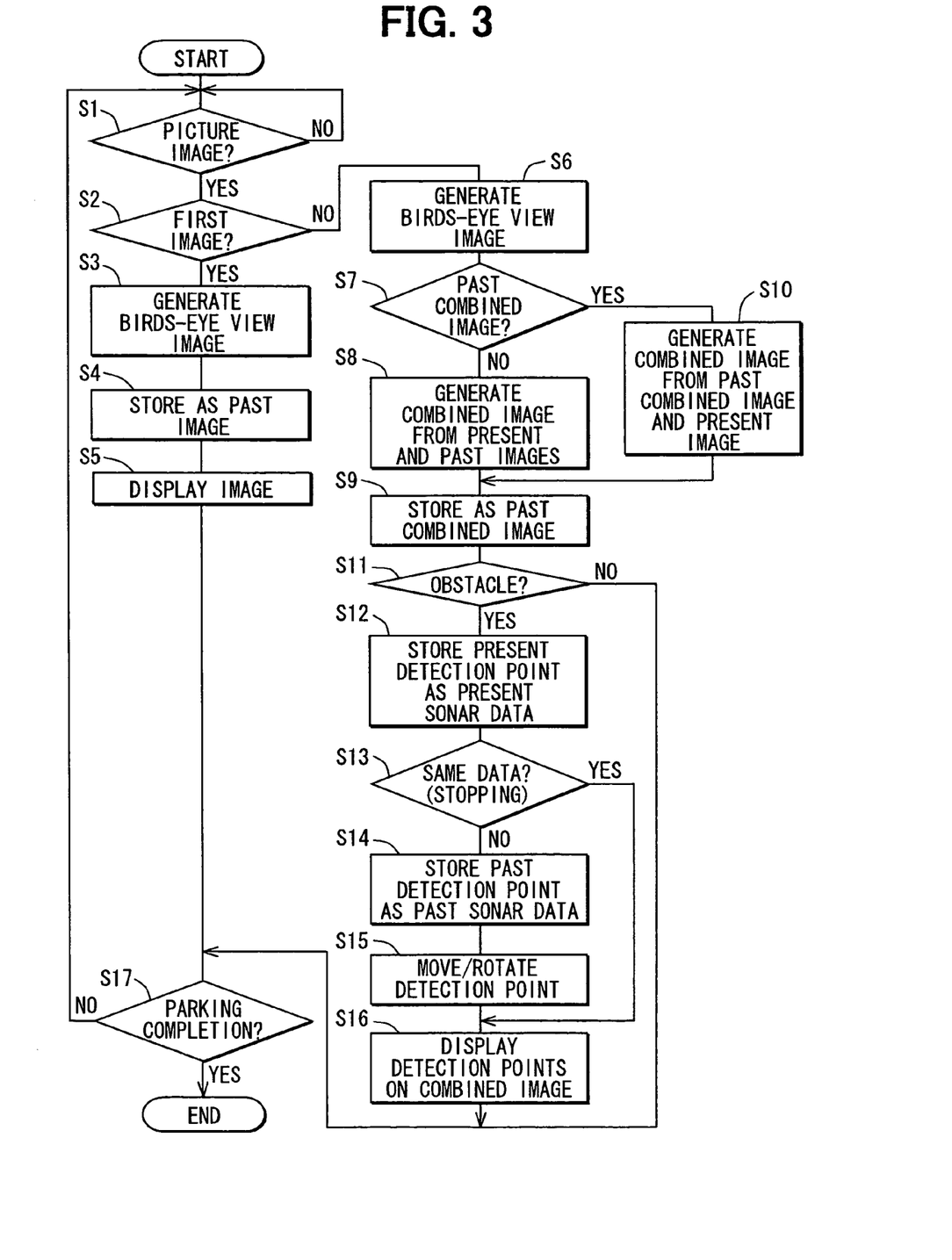
FIG. 3 is a flow diagram showing a part of parking assisting processing executed in the embodiment.
Figure 4A:
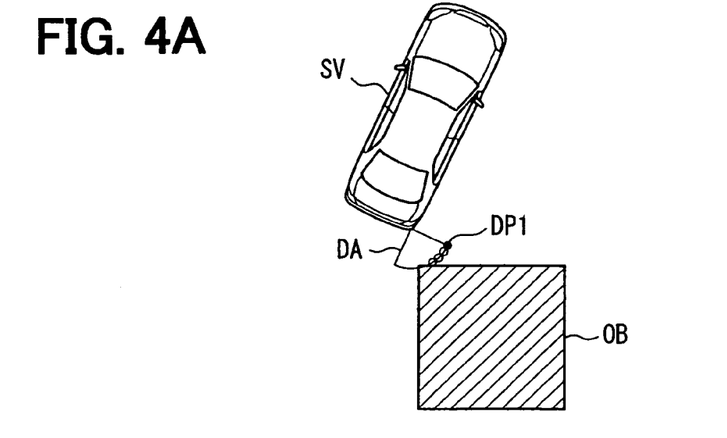
FIGS. 4A to 4C are schematic views showing relations between a vehicle and an obstacle.
Figure 4B:
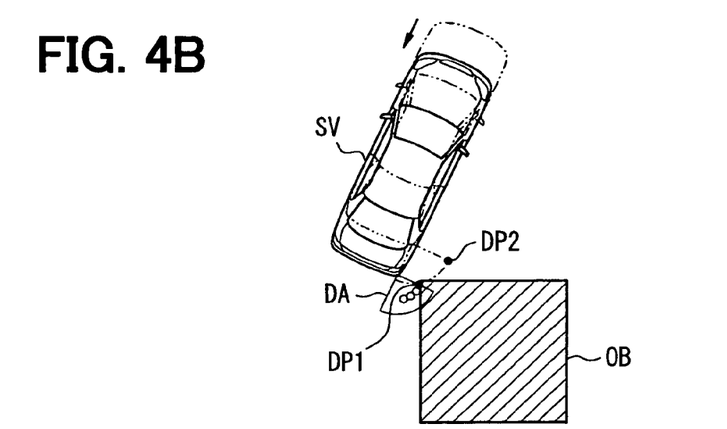
Figure 4C:
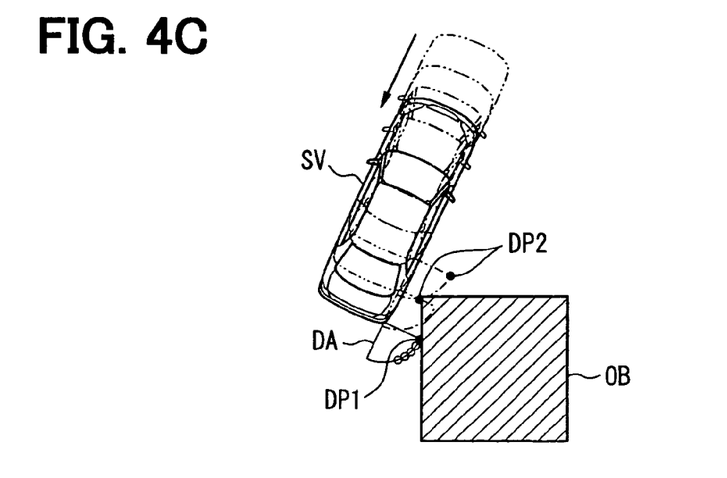

The control unit 2 may be programmed to receive the picture images from the camera 4 at every 100 ms and execute vehicle parking assisting processing shown in FIG. 3. This processing may be initiated by a manual switch (not shown) operated by the driver of the vehicle SV. Alternatively it may be initiated automatically, when a gear position is set to a reverse position R to move and park the vehicle SV in the rearward direction as exemplified in FIGS. 4A to 4C.

The control unit 2 first checks at step (S) 1 whether a picture image has been input from the camera 4. If YES at S1, it then checks at S2 whether it is the first image. If YES at S2, the control unit 2 generates a birds-eye view image at S3 by subjecting the image to a birds-eye view image conversion algorithm. The control unit 2 then at S4 stores this birds-eye view image as a past birds-eye view image, and drives at S5 the display device 10 to display this birds-eye view image.

If NO (not the first picture image) at S2, the control unit 2 generates another birds-eye view image at S6 by subjecting the second or subsequent image to a birds-eye view image conversion algorithm. The control unit 2 then checks at S7 whether the past combined birds-eye view image is stored. If NO at S7, the control unit 2 generates a combined birds-eye view image at S8 by combining the stored past birds-eye view image and the present birds-eye view image. This combined birds-eye view image is stored as the past combined birds-eye view image at S9.

The control unit 2 then checks at S11 whether any obstacle OB is detected by any of the sonar devices 3a to 3f in the detection area DA of each sonar device. If YES at S11 (e.g., FIG. 4A), the control unit 2 stores at S12 this position of a detected obstacle OB in the present data storage device 8 as the present detection point DP1.

The control unit 2 further checks at S13 whether the present sonar data stored at present and previously stored are the same (the vehicle SV is at stop). If the subject vehicle SV is moving or turning as indicated with arrows in FIGS. 4B and 4C), these two stored sonar data differ from each other resulting in the determination of NO at S13. In this instance, the control unit 2 stores at S14 the present detection point DP1, which has been previously stored in the present sonar data storage device 8 as the present sonar data, in the past sonar data storage device 9 as the past sonar data corresponding to the past detection point DP2. Thus, when the vehicle SV is moving or turning, the present detection point DP1 is changed to the past detection point DP2.

Figure 5A:
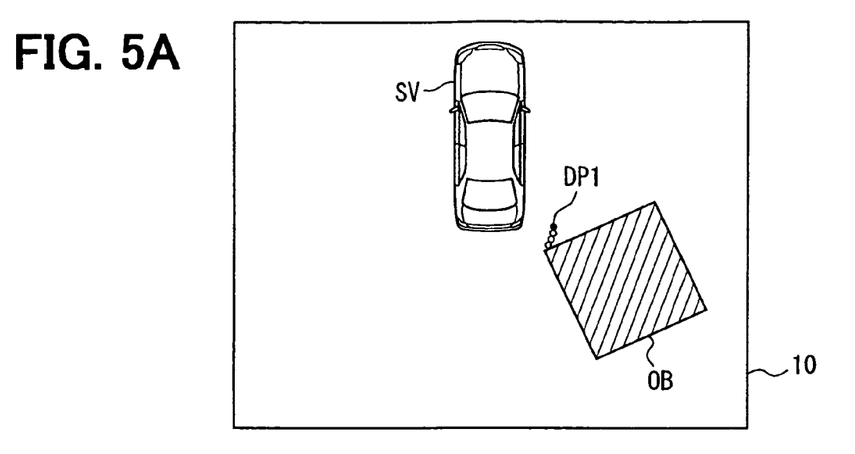
FIGS. 5A to 5C are schematic views showing display images provided in a vehicle in correspondence to the relations shown in FIGS. 4A to 4C.
Figure 5B:
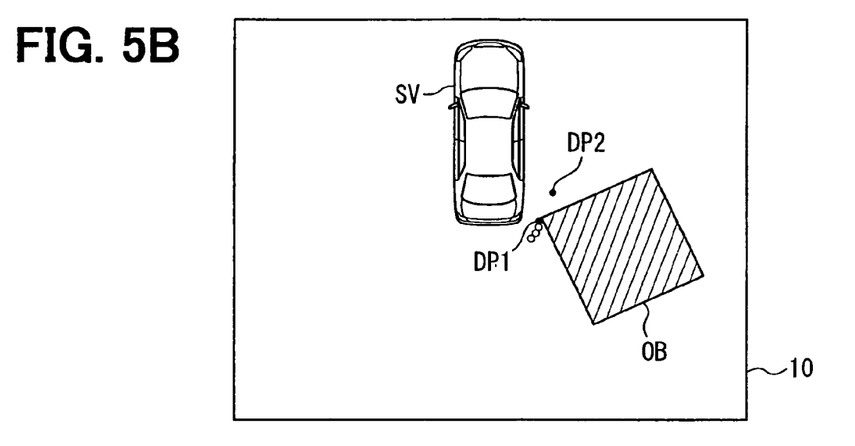
Figure 5C:
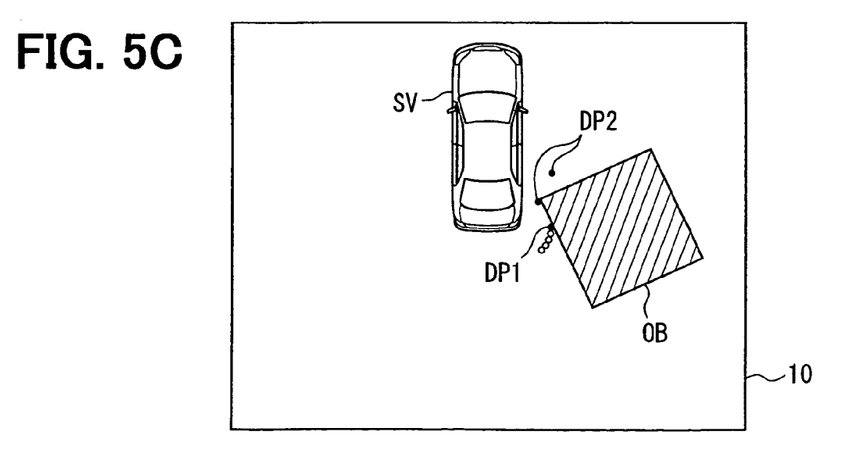

The control unit 2 changes the present detection points DP1 and the past detection points DP2 at S15, and drives the display device 10 to indicate these detection points DP1 and DP2 on the displayed birds-eye view image at S16. As a result, the display image on the display device 10 changes as shown in FIGS. 5A to 5C in correspondence to the movement of the vehicle SV shown in FIGS. 4A to 4C, respectively.

If the determination at S13 is YES indicating that the two data are the same, that is, the vehicle SV is not moving but stopping, the control unit 2 keeps storing the present sonar data in the present sonar data storage device 8 without changing it to the past data. The control unit 2 thus drives at S16 the display device 10 to display the present detection point DP1 by overlapping it on the displayed combined birds-eye view image.

After driving the display device 10 at S5 or S16, the control unit 2 checks at S17 whether the vehicle SV has stopped, that is, completed parking. If NO at S17, the control unit 2 repeats the above processing again from S1 to S17. If YES at S17, the control unit 2 ends the above processing.

The operation of the system 1 is summarized with reference to FIGS. 4A to 4C and 5A to 5C, assuming that the vehicle SV moves in its rearward direction and the obstacle OB exists in the right rear direction from the vehicle SV. In this situation, the sonar device 3f provided at the right rear end of the vehicle SV detects the obstacle OB.

The display device 10 is controlled to indicate the present detection point DP1 as a series of marks such as dots shown in black or white. The dots are along the arcuate border of its detection area DA over about 45° from a predetermined point (black dot), which is arbitrarily determined. In this embodiment, this point is set to be generally perpendicular to the longitudinal line of the vehicle SV and farthest in the detection area DA from the sonar device 3f. The display 10 is controlled, on the other hand, to indicate the past detection point DP2 as a black, which is also generally perpendicular to the longitudinal line of the vehicle SV and farthest in the detection area DA from the sonar device 3f. As a result, the display device 10 will not indicate the present detection point PD1 and the past detection point PD2 at positions away from the outer periphery of the obstacle OB, but will indicate the same along the outer periphery of the obstacle OB.

The control unit 2 may be further programmed to change a display mode of the detection points in correspondence with the distance between the vehicle SV and the obstacle OB. For this purpose, the control unit 2 may execute another processing shown in FIG. 6.

Figure 6:
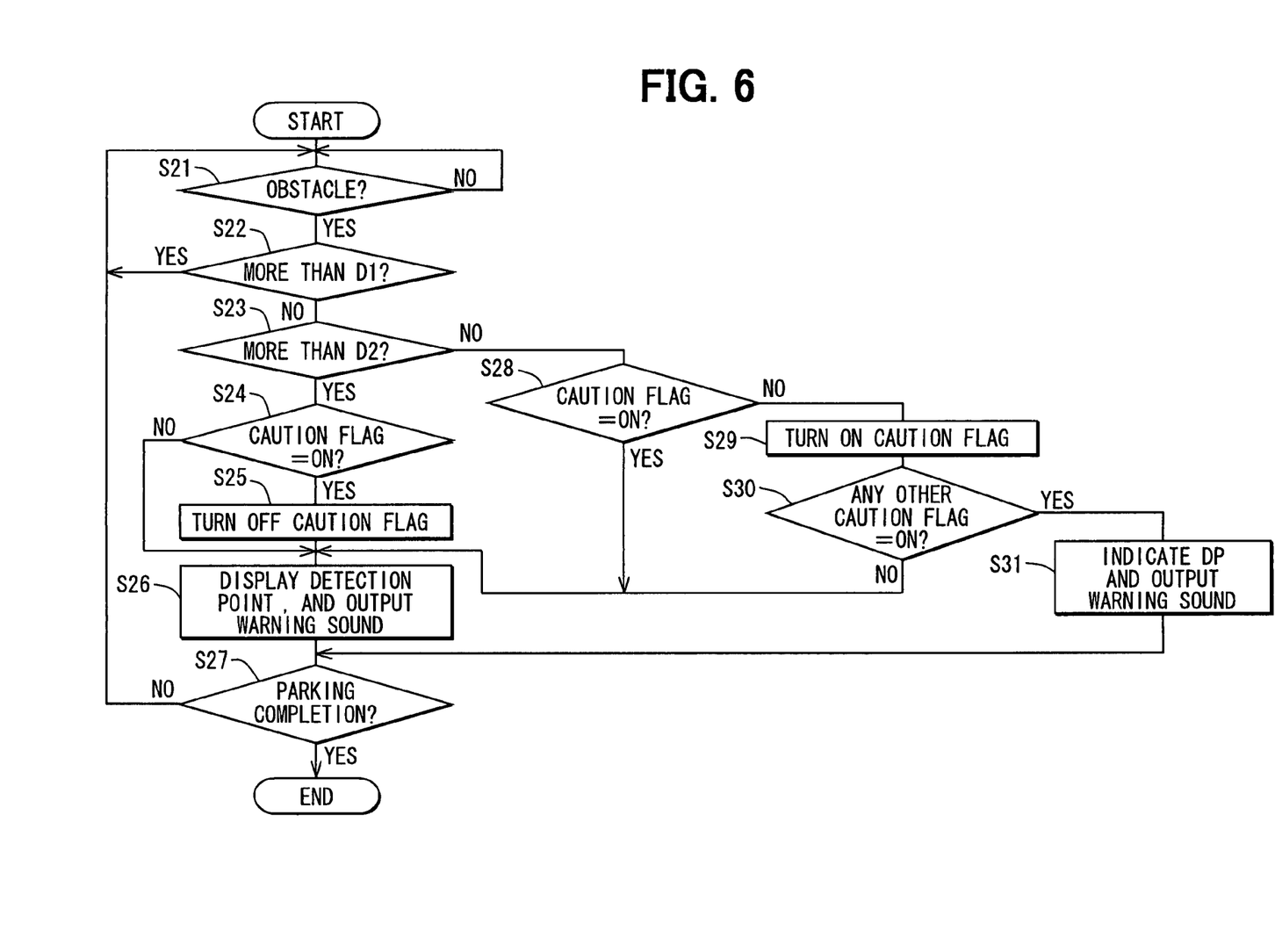
FIG. 6 is a flow diagram showing another part of parking assisting processing executed in the embodiment.

Specifically, the control unit 2 checks at S21 whether any of the sonar 3a to 3f has detected the obstacle OB. If YES at S21, the control unit 2 checks at S22 and S23 whether the distance from the vehicle SV to the detection point DP is more than a predetermined first distance D1 and/or a predetermined second distance D2 shorter than the first distance D1, respectively. If YES at S22, that is, the obstacle OB is sufficiently away from the vehicle SV, the detection point DP is not displayed on the display device 10.

If NO at S22 but YES at S23, that is, the distance is between the first distance D1 and the second distance D2, the control unit 2 checks at S24 whether a caution flag of the sonar device (e.g., 3f), which has detected the obstacle OB, has already been set to ON. The caution flag indicates that the vehicle SV is approaching to the obstacle OB so that the driver needs a caution to the obstacle OB. If YES at S24, the control unit 2 turns off the caution flag at S25 and drives the display device 10 at S26 to indicate the detection point DP on the combined birds-eye view image in the overlapping manner. At this S26, the control unit 26 further drives the sound output device 11 to output a warning sound (e.g., voice message) to invite the driver's caution. The indication of the detection point DP and the warning sound generation at S26 may be made in a predetermined mode corresponding to the distance (between D1 and D2) to the obstacle OB.

The control unit 2 then checks at S27 whether the vehicle SV has stopped, that is, the parking operation has been completed. If NO at S27, the control unit 2 repeats the above processing from S21. If YES at S27, the control unit 2 ends the above processing.

Figure 7A:
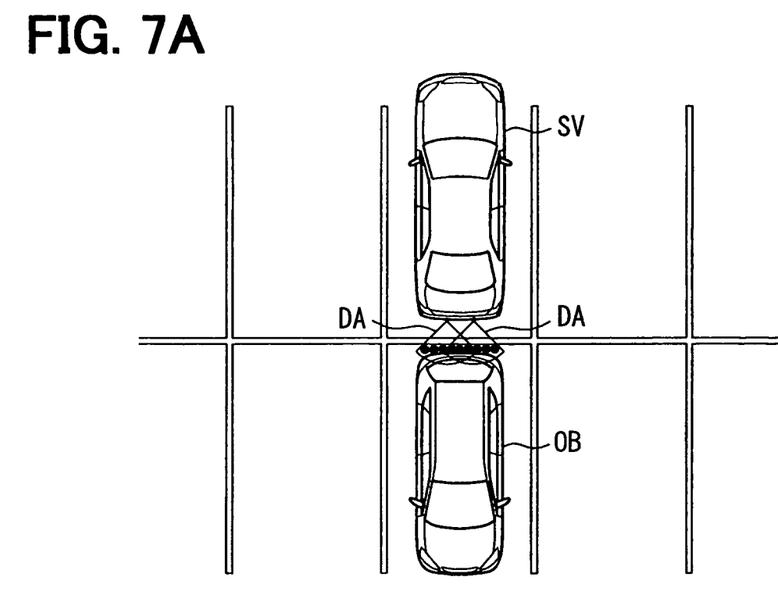
FIGS. 7A and 7B are schematic views showing relations between the vehicle and the obstacle.
Figure 8A:
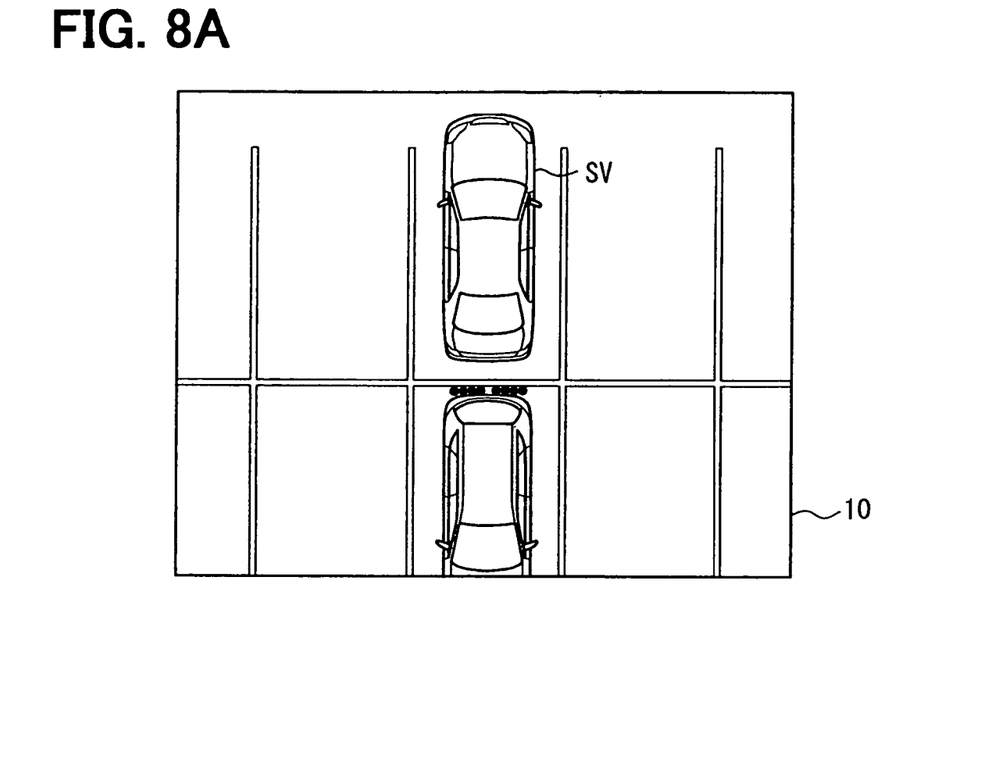
FIGS. 8A and 8B are schematic views showing display images provided in the vehicle in correspondence to the relations shown in FIGS. 7A and 7B.

Thus, if some sonar devices (e.g., 3d and 3e) of the vehicle SV detects another vehicle as the obstacle OB between an intermediate distance range (between D1 and D2) when moving in the rearward direction as shown in FIG. 7A, the display device 10 is driven to indicate the detection point in yellow dots as shown in FIG. 8A on its combined birds-eye view image. The sound output device 11 is also driven to generate the warning sound.

On the contrary, if the determination at S23 is NO, that is, the vehicle SV is approaching the obstacle too close (less than D2), the control unit 2 checks at S28 whether the caution flag has already been set to ON. If YES at S28, the control unit 2 drives the display device 10 and the sound output device 11 at S26 to indicate the detection point DP on the combined birds-eye view image and generate the warning sound in another predetermined mode corresponding to the distance (less than D2) to the obstacle OB.

If the determination at S28 is NO, that is, the caution flag of the sonar device, which has detected the obstacle OB, has not been set to ON yet, the control unit 2 sets the caution flag to ON at S29. The control unit 2 further checks at S30 whether caution flags of other sonar devices, which have not detected the obstacle OB, have been set to ON. If NO at S30, the control unit 2 drives the display device 10 and the sound output device 11 at S26 in the same manner as performed following S28.

Figure 7B:
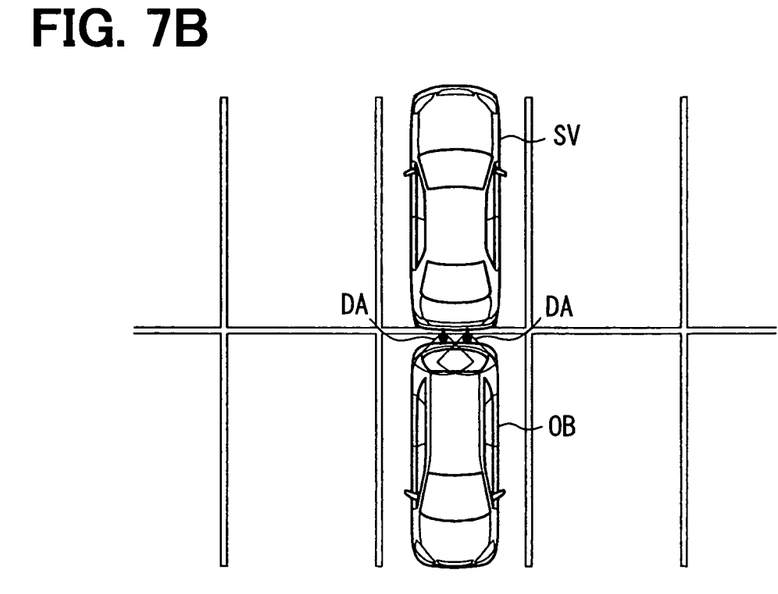
Figure 8B:
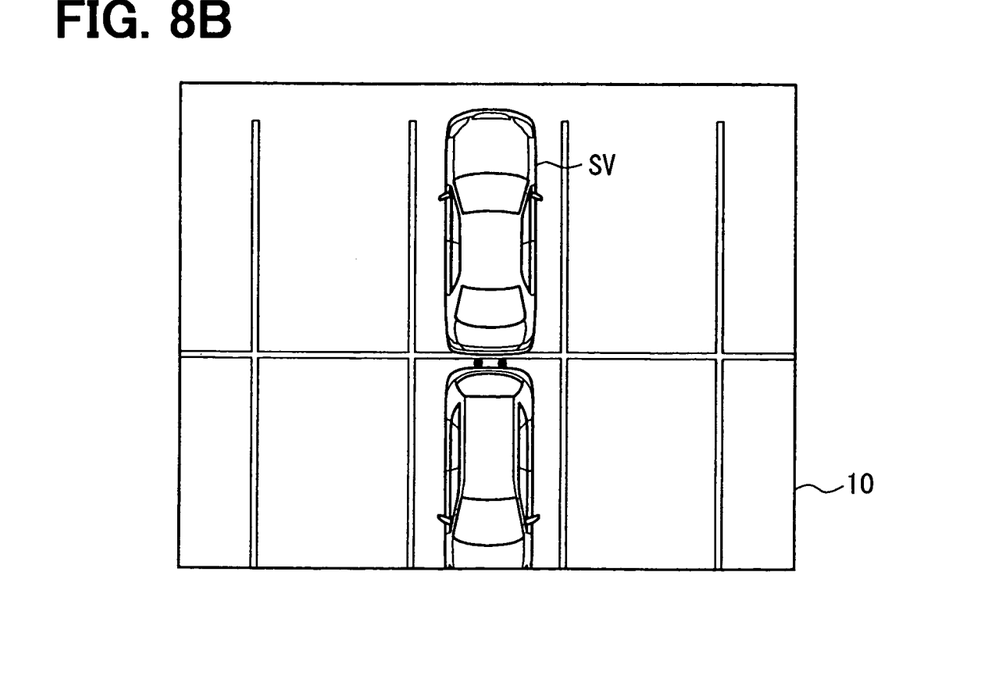

Thus, when the vehicle SV approaches too close (less than D2) to the obstacle OB as shown in FIG. 7B, the display device 10 is driven to indicate the detection point DP in red dots as shown in FIG. 8B and the sound output device 11 is driven to generate the warning sound.

Figure 9A:
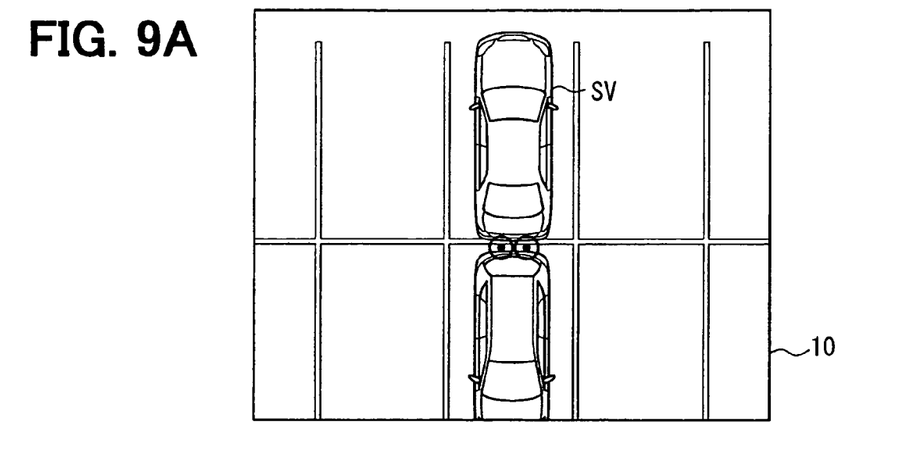
FIGS. 9A to 9C are schematic views showing display images provided in the vehicle.
Figure 9B:
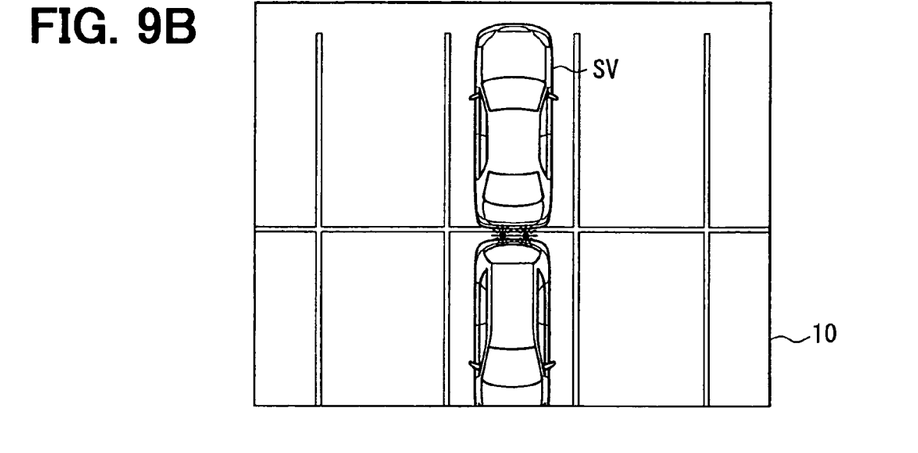
Figure 9C:
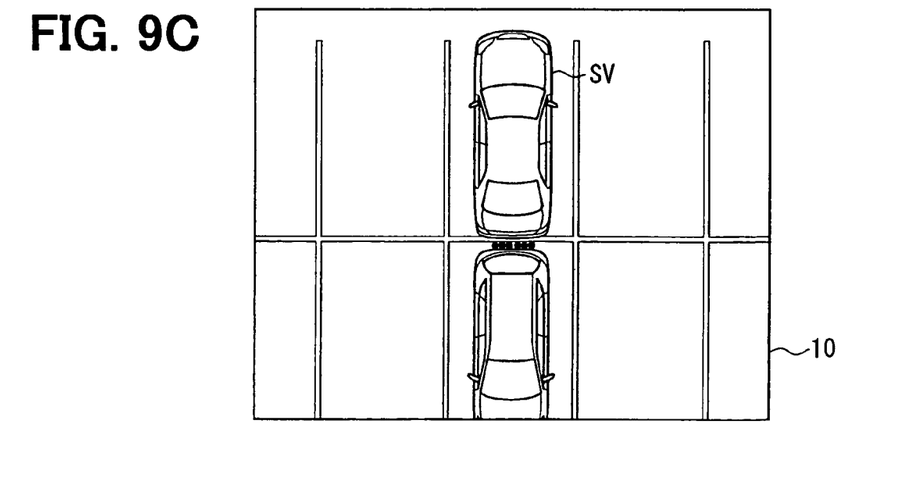

In addition, as shown in FIGS. 9A to 9C, the detection point may be indicated with a circle around the dot, with flashing and with additional marks (dots) arranged in the direction perpendicular to the direction of detection of the object OB, respectively.

Figure 10A:
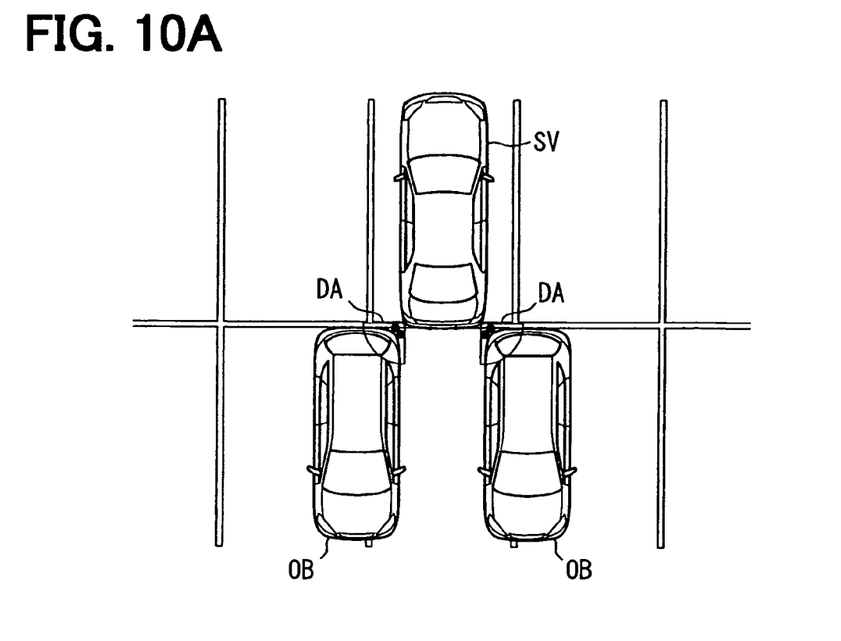
FIGS. 10A and 10B are schematic views showing relations between the vehicle and the obstacle.
Figure 10B:
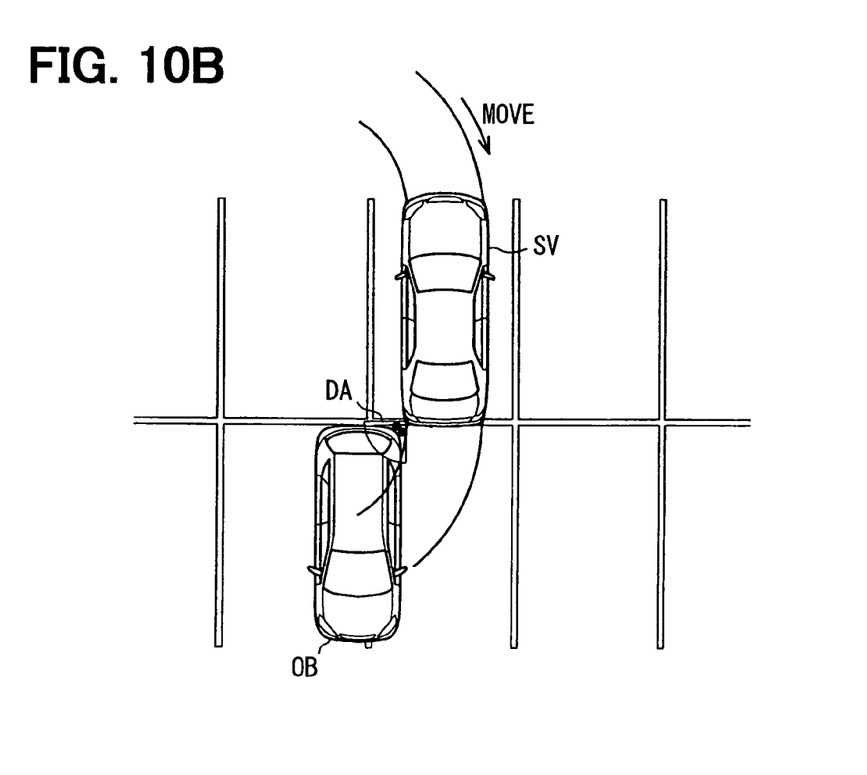
Figure 11A:
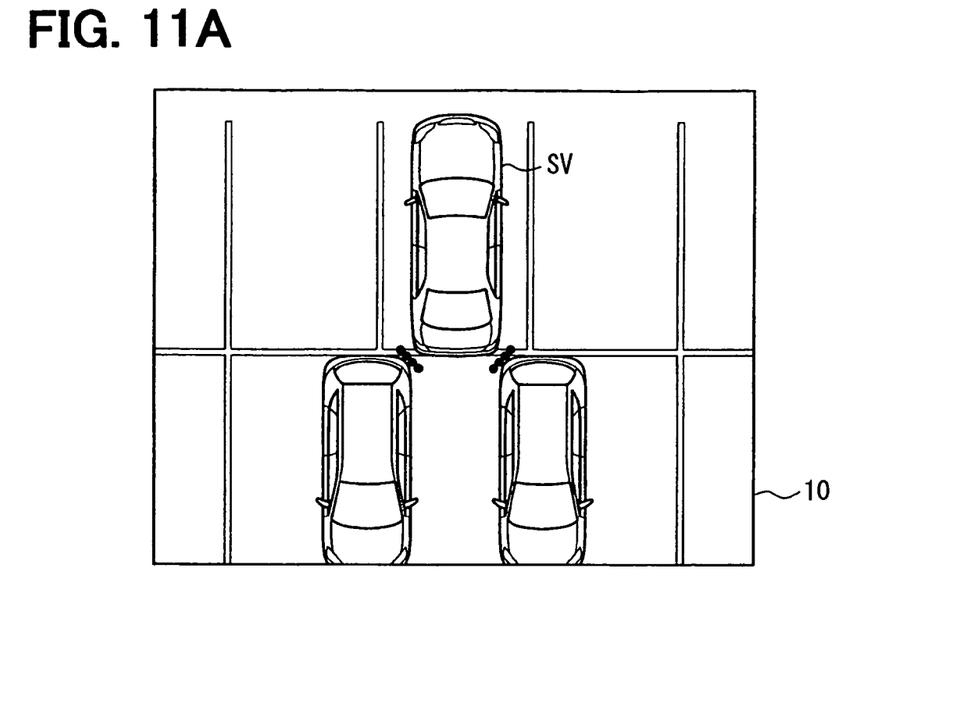
FIGS. 11A and 11B are schematic views showing display images provided in the vehicle in correspondence to the relations shown in FIGS. 10A and 10B.
Figure 11B:
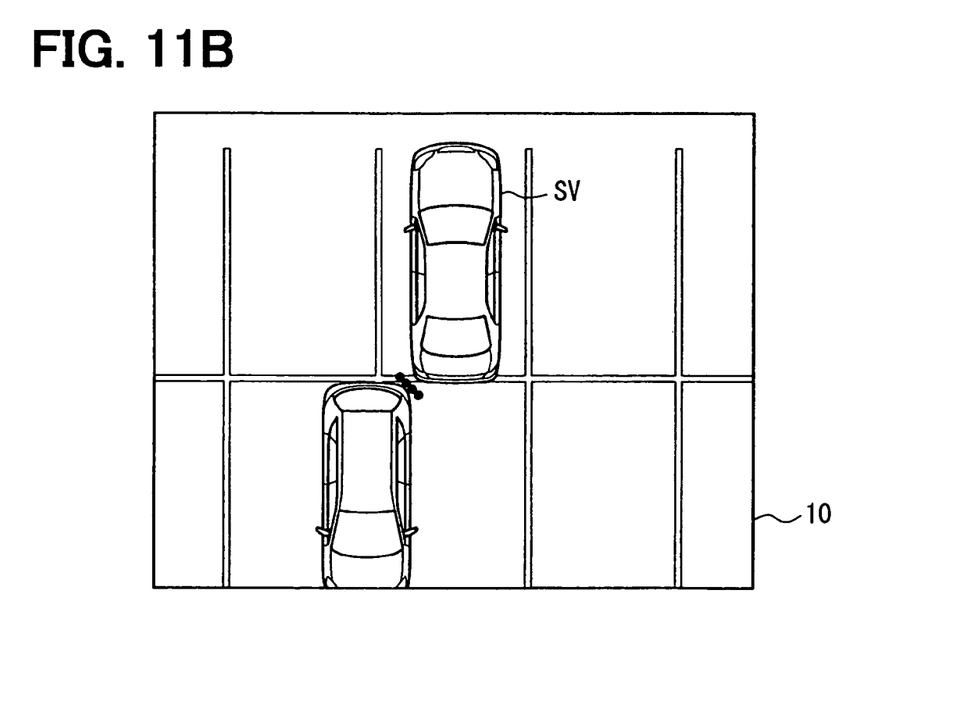

Further, in case that the obstacle OB is located in the diagonally rearward direction from the vehicle SV and detected by the sonar device 3c and/or 3f as shown in FIGS. 10A and 10B, the detection point may be indicated with additional marks arranged in the direction perpendicular to the direction of detection of the object OB as shown in FIGS. 11A and 11B, respectively. The number of these additional marks should be determined not to limit the space available to parking too much.

In the processing of FIG. 6, if the determination at S30 is YES indicating that any of the other sonar devices has detected another obstacle, the control unit 2 drives the display device 10 to indicate another detection point on the birds-eye view image. In this instance, the display device 11 is driven to change the display mode of the detection point indicated previously from the normal mode. The sound output device 11 is driven to generate another warning sound in correspondence to the detected distance to another obstacle.

Figure 12:
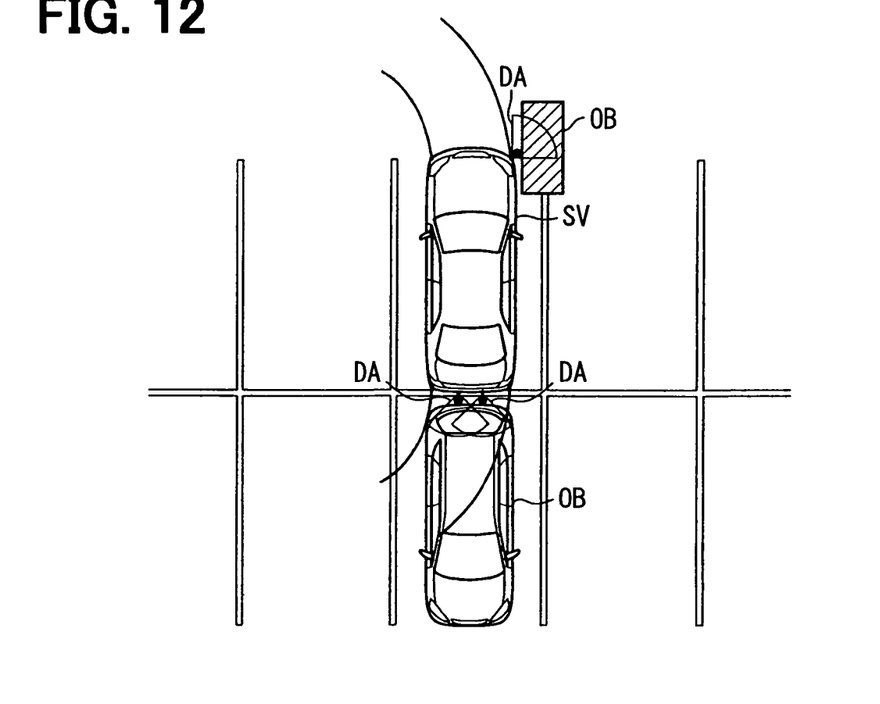
FIG. 12 is a schematic view showing a relation between the vehicle and the obstacle.
Figure 13:
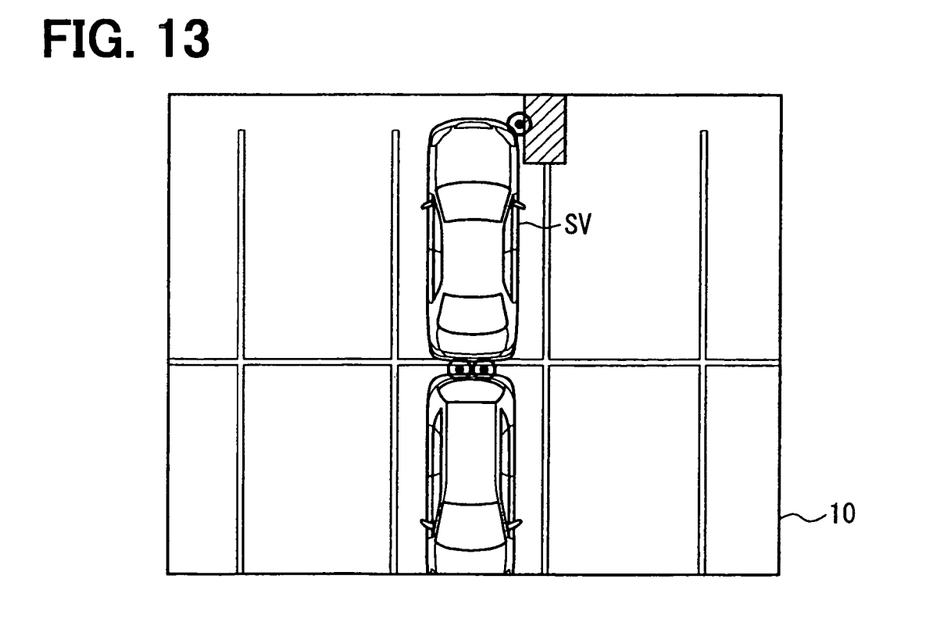
FIG. 13 is a schematic view showing a display image provided in the vehicle in correspondence to the relation shown in FIG. 12.

For instance, as shown in FIG. 12, the sonar device 3b at the right front end of the vehicle SV may detect another obstacle OB different from the obstacle (vehicle) OB located rearward of the vehicle SV and detected by the sonar devices 3d and 3e. In this case, as shown in FIG. 13, the display device 10 may be driven to indicate the new detection point near the front right end of the vehicle SV with a dot circled in red and change the color of circles around the dots indicative of the previously detected detection points from red to yellow. Alternatively, the display device 11 may be driven to indicate the new detection point detected by the sonar device 3b in any other display modes different from the display mode of the detection points detected by the sonar devices 3d and 3e.

According to the above embodiment, both the present detection point and the past detection point are displayed on the combined birds-eye view image in the overlapping manner. The present detection point is indicated by a series of dots, which are arranged to start at the location most distanced from the corresponding sonar device in the detection area in the direction generally perpendicular to the longitudinal axis of the subject vehicle and extend in the arch shape over the predetermined angular interval along the detection area of the corresponding sonar device. The past detection point is indicated with the single dot, which is arranged at the location most distanced from the corresponding sonar device in the detection area in the direction generally perpendicular to the longitudinal axis of the subject vehicle.

As a result, the detection points will be indicated along the outer periphery of the obstacle without deviating from the outer periphery of the object. Thus, the space available to the parking of the subject vehicle can be displayed accurately. Further, the series of dots are provided in the arcuate shape to provide some allowances of space relative to the obstacle. Therefore, this display can provide more secure assistance in the parking operation.

In addition, if the detected distance becomes close to the predetermined distance (D2), the display of the detection point on the display device is emphasized to notify that the vehicle is approaching the obstacle, thus inviting caution of the driver. If the detected distance becomes less than the predetermined distance, additional indication is added to the normal indication of the detection point. Therefore, even if the detection point is indicated in a very small area on the display device and may not be recognized with ease by the driver, the additional indication will attract attention of the driver easily so that the driver will recognize that the vehicle is approaching the obstacle very much.

Still further, if another obstacle is detected near the front right end of the vehicle in addition to the obstacle having been detected in the rear direction, the new detection point corresponding to obstacle in the front right direction is indicated in addition to the old detection point corresponding to the obstacle in the rear direction by changing the mode of display of the old detection point from the normal mode. Thus, this mode change will direct the attention of the driver from the rear part to the front right on the display.

Furthermore, when any of the sonar devices detects the obstacle, it is determined whether any other sonar device has detected the obstacle based on the caution flag. Therefore, the obstacle can be detected with accuracy without erroneously detecting the obstacle due to lower detection accuracy of the sonar devices.

The above embodiment may be modified in various ways. For instance, the sound output device may be provided or activated only when necessary. The number and the arrangement of the sonar devices may be changed. The display of the detection point may be emphasized by addition of the circle and flashing of the circle. In correspondence to the detected distance, the circle around the detection point may be changed in size and/or color gradually or in steps so that the degree of emphasis may also be changed. The system may be applied to assist a forward parking operation by providing a camera at the front part of the vehicle.

What is claimed is:

1. A vehicle parking assisting system comprising:
    camera means for taking picture images outside a vehicle;
    image generating means for generating a birds-eye view image by subjecting the picture images to a birds-eye view conversion;
    motion detecting means for detecting a motion of the vehicle;
    combined image generating means for generating a combined birds-eye view image by combining, based on the motion of the vehicle, a past birds-eye view image generated previously by the image generating means or a past combined birds-eye view image generated previously with a present birds-eye view image generated at present;
    obstacle detecting means for detecting an obstacle in a fan-shaped detection area around the vehicle; and
    display means for displaying, on the combined birds-eye view image, both a present detection point and a past detection point of the obstacle in an overlapping manner,
    wherein the display means displays the present detection point as a series of marks extending from a predetermined position in the fan-shaped detection area in an arcuate shape along the detection area of the obstacle detecting means, and the past detection point as a mark located at the predetermined position in the fan-shaped detection area.

2. The vehicle parking assisting system according to claim 1, wherein the display means changes a display mode of the detection point from a normal mode when the obstacle detecting means detects that the vehicle is approaching the obstacle to be less than a predetermined distance.

3. The vehicle parking assisting system according to claim 2, wherein the display means changes the display mode from the normal mode to a mode, in which the detection point is displayed with emphasis.

4. The vehicle parking assisting system according to claim 2, wherein the display means further displays additional detection points as well as the present detection point in a direction perpendicular to a direction of detection of the obstacle by the obstacle detection means.

5. The vehicle parking assisting system according to claim 2, wherein the display means further displays additional detection points as well as the present detection point in a direction perpendicular to a rearward direction of the vehicle.

6. The vehicle parking assisting system according to claim 1, wherein, when another obstacle detecting means detects another obstacle, the display means further displays another detection point corresponding to the another obstacle in addition to the detection point already in display and changes a display mode of the detection point already in display from a normal mode.

7. The vehicle parking assisting system according to claim 1, wherein, when another obstacle detecting means detects another obstacle, the display means further displays another detection point corresponding to the another obstacle in addition to the detection point already in display in a display mode different from that of the detection point already in display.

8. A vehicle parking assisting method comprising:
    taking picture images outside a vehicle;
    converting the picture images to a birds-eye view image including the vehicle;
    detecting an obstacle in a fan-shaped detection area around the vehicle; and
    displaying the birds-eye view image and both of a present detection point and a past detection point of the obstacle in an overlapping manner on a display device in the vehicle,
    wherein the displaying displays the present detection point as a series of marks extending from a predetermined position in the fan-shaped detection area in an arcuate shape along the detection area, and the past detection point as a mark located at the predetermined position in the fan-shaped detection area.

9. The vehicle parking assisting method according to claim 8, further comprising:
    changing a display mode of the present detection point when a distance between the vehicle and the object becomes less than a predetermined distance to a mode, which is more noticeable than when the distance is more than the predetermined distance.

10. The vehicle parking assisting method according to claim 9, further comprising:
    displaying, when another obstacle is detected in addition to the obstacle displayed already, another detection point corresponding to the another obstacle in addition to the detection point already in display; and
    changing a display mode of the detection point already in display so that the detection point already in display and the another detection point are displayed in different display modes from each other.

* * * * *